(12) United States Patent
Lapin et al.

(10) Patent No.: US 7,945,572 B2
(45) Date of Patent: May 17, 2011

(54) PATTERN DISCOVERY THROUGH REVERSING TIME FLOW

(75) Inventors: Brett D. Lapin, Alexandria, VA (US); David W. Porter, Annapolis, MD (US)

(73) Assignee: The Johns Hopkins University, Baltimore, MD (US)

( * ) Notice: Subject to any disclaimer, the term of this patent is extended or adjusted under 35 U.S.C. 154(b) by 701 days.

(21) Appl. No.: 12/053,224

(22) Filed: Mar. 21, 2008

(65) Prior Publication Data

US 2009/0228443 A1    Sep. 10, 2009

Related U.S. Application Data

(60) Provisional application No. 60/896,070, filed on Mar. 21, 2007.

(51) Int. Cl.
*G06F 17/30*    (2006.01)

(52) U.S. Cl. ........ 707/752; 707/753; 707/769; 707/776; 707/708; 707/E17.014; 707/E17.044; 707/E17.039; 707/999.6; 707/999.7

(58) Field of Classification Search .................. None
See application file for complete search history.

(56) References Cited

U.S. PATENT DOCUMENTS

| | | | |
|---|---|---|---|
| 5,920,855 A | 7/1999 | Aggarwal et al. | |
| 6,185,549 B1 | 2/2001 | Rastogi et al. | |
| 6,754,651 B2 | 6/2004 | Nanavati et al. | |
| 6,865,582 B2 | 3/2005 | Obradovic et al. | |
| 6,944,616 B2 | 9/2005 | Ferguson et al. | |
| 6,990,487 B2 | 1/2006 | Akaboshi et al. | |

*Primary Examiner* — Don Wong
*Assistant Examiner* — Andalib F Lodhi
(74) *Attorney, Agent, or Firm* — Albert J. Fasulo, II

(57) ABSTRACT

The present invention provides systems and methods for automatically mining massive intelligence databases to discover sequential patterns therein using a novel combination of forward and reverse temporal processing techniques as an enhancement to well known pattern discovery algorithms.

21 Claims, 6 Drawing Sheets

| DATA ELEMENT | TIME-STAMP INFORMATION (min:sec) | Reverse TIME-STAMP INFORMATION (min:sec) |
|---|---|---|
| A | 0:03 | 2:25 |
| B | 0:06 | 2:22 |
| A | 0:17 | 2:11 |
| B | 0:19 | 2:09 |
| C | 0:25 | 2:03 |
| D | 0:28 | 2:00 |
| B | 0:37 | 1:51 |
| A | 0:49 | 1:39 |
| B | 0:54 | 1:34 |
| C | 0:56 | 1:32 |
| A | 1:04 | 1:24 |
| A | 1:16 | 1:12 |
| B | 1:18 | 1:10 |
| C | 1:23 | 1:05 |
| A | 1:36 | 0:52 |
| B | 1:43 | 0:45 |
| A | 1:47 | 0:41 |
| B | 1:51 | 0:37 |
| C | 1:53 | 0:35 |
| A | 2:03 | 0:25 |
| B | 2:06 | 0:22 |
| C | 2:08 | 0:20 |
| A | 2:19 | 0:09 |
| B | 2:28 | 0:00 |

FIGURE 2B

| BIN # 1 | BIN # 2 | BIN # 3 | BIN # 4 | BIN # 5 | BIN # 6 | BIN # 7 | BIN # 8 | BIN # 9 | BIN # 10 |
|---|---|---|---|---|---|---|---|---|---|
| 0 – 15 | 15 – 30 | 30 – 45 | 45 – 1:00 | 1:00 – 1:15 | 1:15 – 1:30 | 1:30 – 1:45 | 1:45 – 2:00 | 2:00 – 2:15 | 2:15 – 2:30 |

FIGURE 2C

FORWARD PROCESSING →

|  |  |  |  |  |
|---|---|---|---|---|
| BIN # 1 | A | B |  |  |
| BIN # 2 | A | B | C | D |
| BIN # 3 |  | B |  |  |
| BIN # 4 | A | B | C |  |
| BIN # 5 | A |  |  |  |
| BIN # 6 | A | B | C |  |
| BIN # 7 | A | B |  |  |
| BIN # 8 | A | B | C |  |
| BIN # 9 | A | B | C |  |
| BIN # 10 | A | B |  |  |

FIGURE 2D

| | | | | | | | | | |
|---|---|---|---|---|---|---|---|---|---|
| | A | A | | A | A | A | A | A | A | A |
| | B | B | B | B | | B | B | B | B | B |
| | | C | | C | | C | | C | C | |
| | D | | | | | | | | | |
| BIN #1 | BIN #2 | BIN #3 | BIN #4 | BIN #5 | BIN #6 | BIN #7 | BIN #8 | BIN #9 | BIN #10 |

REVERSE PROCESSING

FIGURE 2E

PATTERN DISCOVERY THROUGH REVERSING TIME FLOW

CROSS-REFERENCE TO RELATED APPLICATIONS

This application claims the benefit of prior fled U.S. application No. 60/896,070, filed on Mar. 21, 2007, which is incorporated herein by reference in its entirety.

STATEMENT OF GOVERNMENTAL INTEREST

This invention was made with U.S. Government support under contract no. 01-C4750. The U.S. Government has certain rights in the invention.

BACKGROUND OF THE INVENTION

1. Field of the Invention

The present invention relates generally to the field of data mining and, more particularly, to methods and systems for mining one or more structured datasets to automatically extract patterns or associations within the data.

2. Description of the Related Art

One of the growing, critical challenges facing the intelligence community is to produce actionable intelligence from massive (and still-increasing) datasets, in a decreasing amount of time. Current analysis tools, such as GALE (Generic Area Limitation Environment) or DCGS (Distributed Common Ground Systems), enable analysts to examine, and confirm or reject, hypotheses they have formed. These confirmatory methods and tools are a necessary part of intelligence analysis; however, they use a trial-and-error based approach that consumes large amounts of time, and they highlight one of the shortcomings of using only the tried-and-true methods of the previous generations of analysts in today's world.

Previous analysis methods were human-centric and, as such, allowed the extraordinary decision capabilities of the mind to be leveraged in analyzing the pertinent, hard-to-come-by intelligence data. With the massive collections of data that occur every day, indeed every hour, in a region of interest, the human mind can only leverage its power on an infinitesimal portion of the collected data. Moreover, it is now an extremely complex challenge to know which are the pertinent data buried in the massive amounts of collected data.

A need therefore exists for an automated, exploratory, data-centric mode of analysis capable of discovering patterns, creating metadata, or simply generating a more concentrated grouping of data to be added to the manual, confirmatory, human-centric mode to facilitate the vast majority of data collected. This data-centric mode of analysis must leverage the processing power of computers to assist the analysts in producing critical actionable intelligence needed to facilitate national security.

SUMMARY OF THE INVENTION

The present invention provides systems and methods for automatically mining massive intelligence databases to discover sequential patterns therein using a novel combination of forward and reverse temporal processing techniques as an enhancement to well known pattern discovery algorithms.

Rule induction algorithms constitute a well-known class of pattern discovery algorithms that can be used to facilitate automated discovery of patterns or associations within structured datasets. The patterns comprise associations of database elements that repeat throughout an examined time-pace. One type of rule induction algorithm is known as Sequential Rule Induction (SRI) which discovers repetitive sequential patterns (RSPs). In general, SRI discovers RSPs by first amassing candidate patterns, and subsequently pruning/removing candidate patterns that do not pass one or more statistical thresholds set by the user. The present invention enhances these well-known pattern discovery algorithms by incorporating forward and reverse temporal processing in a fully automated capability for efficiently discovering a subset of repetitive sequential patterns (RSPs) hidden in typically large datasets.

In accordance with one embodiment of the invention there is provided a software tool which implements an automated discovery process, based on the aforementioned well-known pattern discovery algorithms enhanced by reverse and forward temporal processing techniques. The software tool operates by utilizing sequential rule induction as an underlying algorithm together with reverse and forward temporal processing techniques to mine massive databases to discover sequential patterns being exhibited by the database elements.

In one aspect of the invention, techniques for mining massive databases to discover sequential patterns therein using a novel combination of forward and reverse temporal processing techniques, comprise the following steps/operations. Input is provided to the software tool which includes one or more input data files in conjunction with a set of user-defined parameters. In a first processing segment, the software tool operates on this input data to output (discover) a candidate set of patterns. In a second processing segment, statistical thresholds are used to prune the candidate set of patterns, output from the first processing segment, to generate and output the final set of patterns. Using the final set of patterns, the final processing segment involves reaching into the original input dataset(s), and extracting the actual data elements that comprise each of the patterns in the final set. These extracted data elements are then post-processed and arranged in the appropriate order, that is, as described by the patterns. This output can be input to a visualization tool to display the pattern elements. Alternatively, visualization can also be a simple tabular listing of the patterns.

Beneficially, the present invention provides capabilities for mining massive datasets in an automated fashion and in a timely manner to discover sequential patterns buried within the data Experimental results have indicated typical processing times on commercial off-the-shelf platforms range from several minutes for large regular datasets, to one or two hours when handling large dense datasets.

BRIEF DESCRIPTION OF THE DRAWINGS

These and other objects, features and advantages of the invention will be apparent from a consideration of the following Detailed Description Of The invention considered in conjunction with the drawing Figures, in which;

FIG. 2b shows an example set of timestamps for the example order of elements in FIG. 2a. Shown are the timestamps in both the forward and reverse temporal directions.

FIG. 2c displays the time bins that result from choosing a bin size of 15 seconds.

FIG. 2d is a tabular representation of bins for the example order of dataset elements of FIG. 2b, given a bin size of 15 seconds and a forward temporal now.

FIG. 2e is a tabular representation of bins for the example order of dataset elements of FIG. 2b, given the same bin size of 15 seconds, but a reverse temporal flow.

DETAILED DESCRIPTION

1. Introduction

Figure 1:
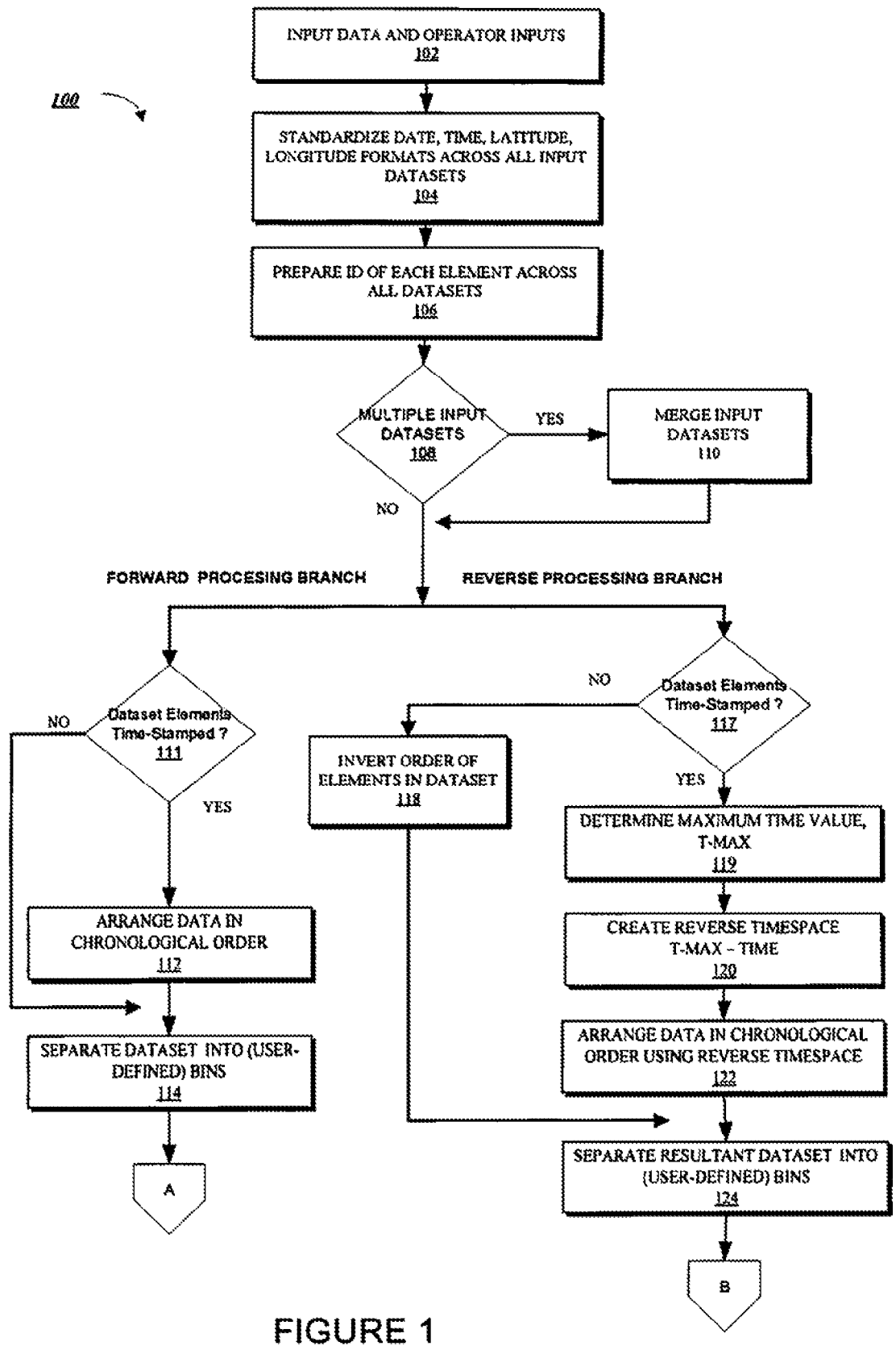
FIG. 1 is a flow diagram illustrating a process for mining massive datasets to discover repetitive sequential patterns (RSPs) hidden within the datasets using forward and reverse processing techniques.
Figure 1:
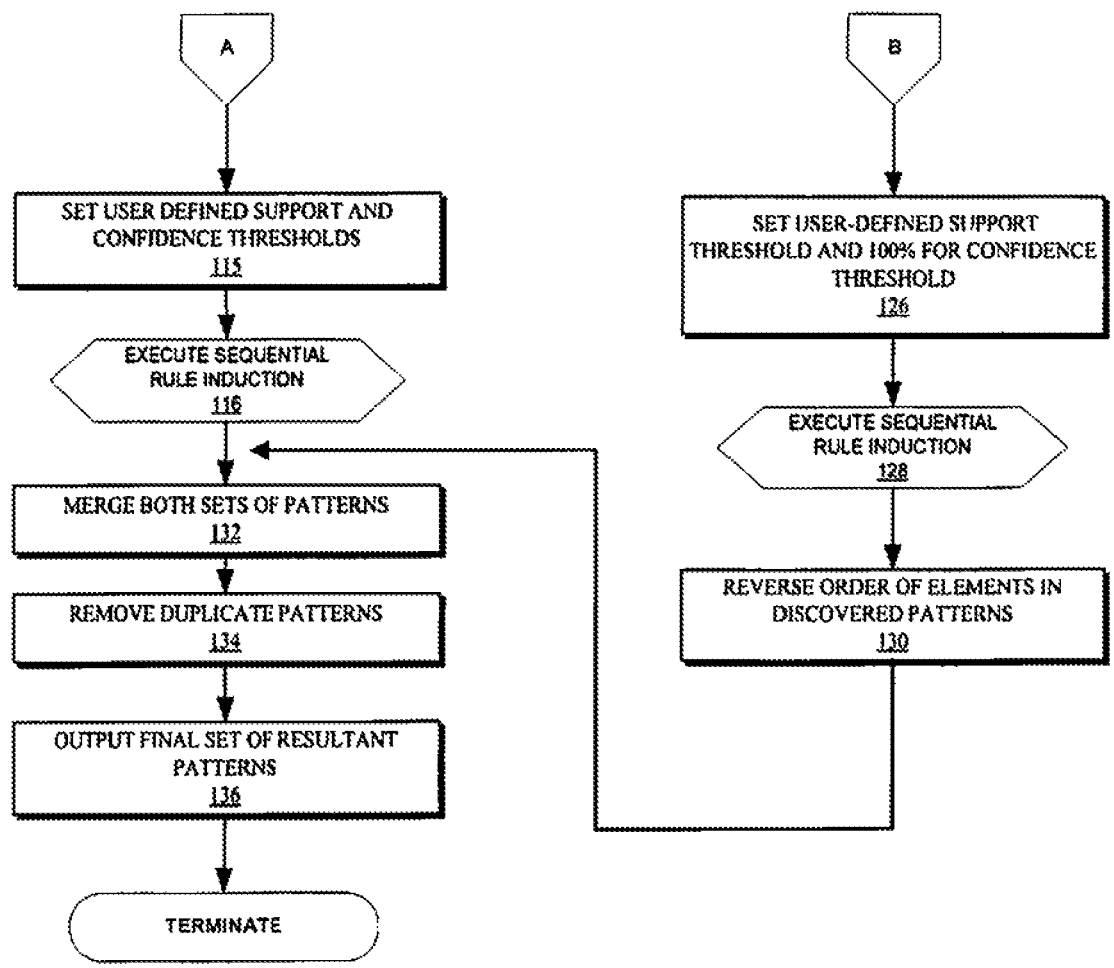

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program codec software, and/or integrated circuits that are coded to perform such functions, unless indicated otherwise.

It should be appreciated that the present invention can be implemented in numerous ways, including as a process, an apparatus, a system, a device, a method, or a computer readable medium such as a computer readable storage medium or a computer network where program instructions are sent over optical or electronic communication links, Several inventive embodiments of the present invention are described below.

The following paragraphs describe a overview of the invention and a software tool for storing and executing software in accordance with an illustrative embodiment of the invention.

As will become apparent, the present invention may generally benefit analysts by providing them with interact and leverage on the products of a data-centric analysis, provided by the present invention, which include patterns, metadata, or simply a more concentrated grouping of data.

As used herein, examples and illustrations are intended to be representative and not limiting in nature.

While described below with respect to mining massive databases, the present invention provides a generic capability for mining any large dataset and is therefore not limited to any particular dataset type, configuration or size.

Overview

In accordance with the present invention, there are provided herein methods and systems for mining massive datasets to discover repetitive sequential patterns (RSPs) hidden within the datasets.

Broadly described, systems and methods of the invention operate by utilizing sequential rule induction (RSI) techniques to discover repetitive sequential patterns (RSPs) by first amassing candidate patterns, and subsequently pruning/removing candidate patterns that do not pass certain statistical thresholds set by a user. These statistical thresholds provide that only significant patterns are kept as outputs to the SRI process. It should be understood that without these thresholds, every sequential combination of elements in the dataset would be considered a valid output, thereby making the output effectively useless.

In a preferred embodiment, a recurring pattern in a dataset is determined to be statistically significant if it passes two thresholds. Once a pattern is determined to be statistically significant, its constituent elements are said to be sequentially associated with each other in a mathematical sense. The two thresholds correspond to the statistical metrics of Support and Confidence, as defined below.

As used herein, a pattern is defined as a sequential association of database elements that repeat throughout an examined dataset. It is noted that the term 'element' can be equated with entities, incidents, transactions, or any general event. An example of a sequential pattern of elements, A1, A2, A3, A4 and C, could be $$A1 \rightarrow A2 + A3 \rightarrow A4 \rightarrow C$$

Where A1 through A4 are referred to as antecedents, and C is referred to as a consequent. The exemplary pattern above may be described as follows: A1 occurred first (antecedent 1), then at some point later elements A2 and A3 occurred simultaneously (antecedent 2), then at some point later A4 occurred (antecedent 3), and the final element, C, occurred sometime after that (the consequent). It will be understood by the reader that the invention can use any element characteristic (selectable by the user) as a discovery variable (or parameter), such as element identification, or filter variable.

It should be noted that time-stamped elements are not essential to carry out the method. If a dataset does not have timestamp information associated with its elements, the order of elements is represented by their position in the dataset. That is, the first element in the dataset is considered to be ordered before all others, the twenty-sixth is considered to be ordered after the twenty-fifth and before the twenty-seventh, and so on.

As used herein, a time bin (or simply bit) describes how a temporal dataset may be divided. For example, if a dataset spans 24 hours, then the user may decide to split up the dataset into time bins of length 30 minutes each, thus Yielding 48 consecutive time bins for the entire dataset.

In an embodiment in which the dataset does not include timestamp information, a bit is simply defined by the number of elements to be included in each bin. For example, if a dataset consisted of 1000 elements, then the user may decide to split the dataset into bins of 30 elements each, thus yielding 33 consecutive bins with 30 elements each, and the last bin with 10 elements.

As used herein, the term Support describes the number of instances a pattern has occurred in a dataset. Support is typically represented as a percentage. In other words, support is a statistic describing how many instances of a particular pattern exist in an entire dataset. Support may be calculated in one way as $$\text{Support (\%)} = \frac{\text{\# of bins in which a pattern has occurred}}{\text{Total \# of bins}} \times 100 \quad \text{Eq. [1]}$$

For example, if a pattern occurs (appears) 36 times in a dataset divided into 48 consecutive bins then the Support for that pattern is calculated as Support=36/48=75%

As used herein, a repetitive sequential pattern (RSP) is a sequential pattern that occurs over and over again in a dataset.

As used herein, Confidence describes how many times the final element of a pattern occurred as a percentage of the number of times the first part of the pattern occurred. For example, if a pattern has 4 elements occurring in the same order over and over again (in the above example the pattern occurs 36 times) in the dataset, then it should be realized that the first 3 elements of that 4-element pattern will have occurred, in that particular order, 'k' times (ins), where 'k' is greater than or equal to 36. So if for example, the first 3 elements occurred 40 times (appeared in 40 bins), then the Confidence would be 90% (36/40)—that is, the last element occurred 36 of the 40 times the first 3 elements occurred in the right order. Confidence is calculated as;

$$\text{Confidence }(\%) = \frac{\text{\# of bins in which complete pattern occurs}}{\text{\# of bins with all but last element in same order}} \times 100 \qquad \text{Eq. [2]}$$

It should be understood that a discovered pattern, will have a calculated Support and Confidence value associated with it. For examples if a 4-element pattern, such as the one discussed above, had elements $\alpha, \beta, \gamma, \delta$, then a pattern may be represented as:

$$\alpha \rightarrow \beta \rightarrow \gamma \Rightarrow \delta (75\%, 90\%)$$

A user sets the thresholds for both Support and Confidence. These thresholds determine which patterns should be pruned in question and which should be provided as outputs, as described above. The user can set both thresholds from 0 to 100%, however, it should be understood that if a user sets the thresholds to 0% then every combination of elements will be considered valid patterns and provided as outputs because even if a pattern occurs only once, and even if the last element occurs only once relative to the first part of the pattern, it still qualifies as a valid pattern.

Because datasets are typically large relative to the size of each bin, there are a large number of bins in a dataset. Therefore, the Support threshold is typically set low in case the data elements are not 'overly' repetitive in nature. This threshold is related fairly closely to the nature of the data, and hence the user does not have as much freedom with this threshold.

The confidence is typically set very high for two reasons. First, it is desirable that the last element of a pattern be almost always present when the first part of the pattern occurs, to provide a fairy good predictive aspect to the pattern. In other words, by setting the confidence parameter high, if the first part of the pattern occurs, then there is a very strong likelihood that the last element will occur within a given timeframe. Secondly, because the Support threshold is typically set low, out of necessity, if the Confidence threshold is also set low, then there will be a lot of patterns passing both thresholds and hence being provided as output. Hence, the Confidence threshold becomes one of the key pruning criteria to keep the output pattern list bounded.

A key feature of the invention, as will be described in detail below, pertains to the concept of reverse temporal processing which involves inverting the temporal order of the elements in a dataset to be mined. This is generally achieved by determining the maximum value for the timestamps of each element, and then subtracting each element's timestamp from the maximum value. This results in a new set of 'reverse-timestamps' that are substituted for the regular timestamps. It should therefore be understood that what was formerly the chronologically last element in the dataset (i.e., the element with the maximum timestamp) will now have a reverse timestamp of 0 and consequentially be the first element in the new, temporally inverted dataset. Further, the chronologically first element of the original dataset (i.e., that with the smallest timestamp) will have the maximum reverse timestamp and therefore be the last element in the inverted dataset.

Method of Operation

Figure 2A:
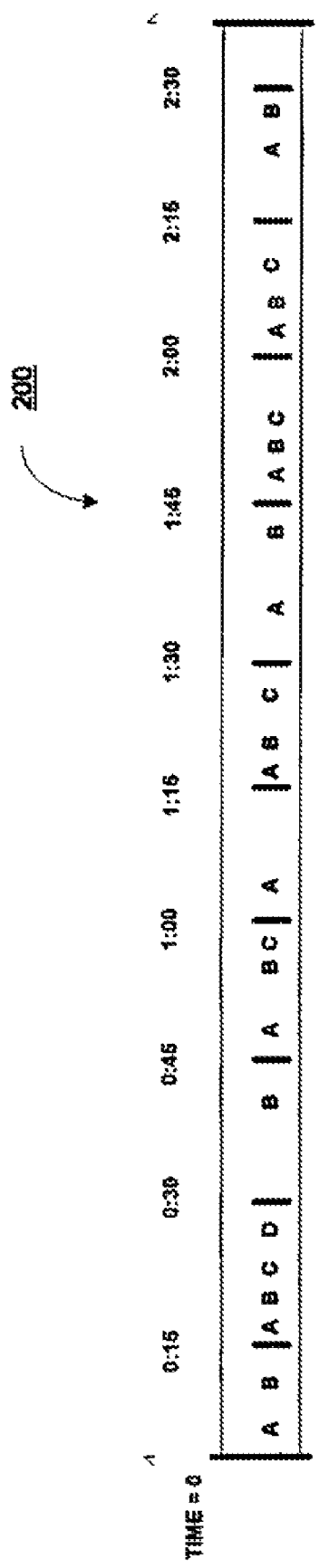
FIG. 2a shows one example dataset with elements A, B, C, and D, listed in the order in with they occurred, with the example timestamps shown in FIG. 2b.

Referring first to FIGS. 1 and 2A, there is shown a timeline of data elements that comprise exemplary dataset 200 to be provided as input to process 100 to discover sequential patterns therein using a novel combination of forward and reverse temporal processing techniques, as will be described below.

Dataset 200 is shown to include 24 data elements (that is, data elements 1 through 24, or DE-1 through DE-24), where each data element is represented by one of 4 distinct identifications, i.e., A through D.

It should be appreciated that the number of data elements of dataset 200 is greatly reduced, for ease of explanation, as compared with a typical massive dataset, for which the invention is well-suited.

Referring now to FIG. 2B, the data elements of dataset 200 are listed in tabular form including forward time-stamp information. As will be described below, this time-stamp information is used by process 100 of FIG. 1 to initially organize the respective data elements (A-D) of dataset 200 into chronological order to facilitate forward and reverse processing in a manner to be described.

With reference now to FIG. 1, there is shown a process 100, for mining massive datasets to discover repetitive sequential patterns (RSPs) hidden within those datasets.

At step 102, one or more input files are provided as input. The input files may comprise, for example (but not limited to), criminal activity data, credit card transactions, rental agreements, intelligence data, or combinations of these.

At step 104, the input dataset undergoes an initial data preparation stage which may include operations such as, but not limited to, normalizing original formats of date, time, latitude, longitude values to a standard format, setting types, discarding blanks, selecting dates, selecting times, and excluding specified elements.

At step 106, The ID of each element is prepared across all datasets. Because element identifications are symbolic in nature, numeric identifiers need to be preprocessed correctly. Also, because of the variability that could exist across the multiple input files, element identifiers need to be processed to ensure compatibility when the input files are fused together.

At step 108, a determination step, it is determined whether there are multiple input datasets. If so, the process continues at step 110 followed by step 112, otherwise the process bypasses step 110 and continues at step 112.

At step 110, the multiple input datasets are merged into a single dataset.

Forward Processing

At step 111, a determination step to determine whether the data elements of the input data set includes time-stamp information. If yes, the process continues at step 112, otherwise the process continues at step 114.

At step 112, the input data is arranged in chronological order based on timestamp information associated with the data. This is shown by way of example in FIG. 2A, in graphical form, and in tabular form in FIG. 2B. In this example, twenty four data items (DE-1 through DE-24, which are made up of A elements, B elements, C elements, and D elements) are arranged in chronological order based on time-stamp information, as shown in column two of the table of FIG. 2B.

It should be understood that the number of data elements shown in the table of FIG. 2B represents a small percentage of the actual totality of data elements that make up dataset 1. This is done for ease of explanation and is not meant to indicate any restrictions or limitations of the present application.

At step 114, the ordered elements are then split into consecutive time bins. In accordance with the present time-stamp example, the time-space of dataset 1 comprises 2.5 hours of time. FIG. 2C illustrates the splitting of time-space for dataset 1. In particular, the time-space of dataset 1 is shown to be divided into ten consecutive user-defined bins, where the user has defined each bin to be 15 minute segments of the 2.5 hour time-space. It should be appreciated that when choosing the length of time for the bins, it is wise to consider the domain being analyzed. For example, the bin length chosen if analyzing earthquake data might be very different than the bin length chosen if analyzing department purchase data.

FIG. 2D illustrates an exemplary tabulation of performing time binning (splitting into consecutive time bins) in the forward direction, at this step. The data elements {A, B, C, D} are used as identifications for the data elements 1 through 24, i.e., DE-1 through DE-24.

At step 115, the user sets the Support and Confidence thresholds.

At step 116, Sequential Rule Induction is applied to the chronologically ordered elements to produce a set of forward repetitive sequential patterns. As described above, the repetitive sequential patterns are sequential associations of dataset elements (e.g., DE-1 through DE-24) that repeat throughout the examined timespace.

Reverse Processing

At step 117, a determination step to determine whether the data elements of the input data set includes time-stamp information. If yes, the process continues at step 119, otherwise the process continues at step 118.

At step 118, the data elements are arranged in reverse order. The process continues at step 124.

At step 119, a maximum time value is determined for the entire dataset, defined herein as T-MAX. This time value is identified by the data element's timestamp. In the present example, T-MAX is equal to 2:28, the timestamp associated with last occurrence of element B.

At step 120, the reverse time-space is created. In the instant example, the value of T-MAX, e.g., 2:28 is used to subtract the time-stamps of every other element in data-set 1 to create the reverse time-space. Column 3 of the table of FIG. 2B illustrates, by way of example, a result of creating a reverse time-space on dataset 1.

At step 122, the elements of data set 1 are arranged in chronological order based on the reverse time-stamp information.

At step 124, the data elements are separated into bins. For time-stamped data, this separation is based on the reverse time-space information; for non time-stamped data, the order of elements in dataset is simply reversed. FIG. 2E illustrates a tabular representation of time binning as applied to the reverse chronologically ordered elements of the example dataset.

At step 126, the user sets the Support threshold and further sets the Confidence threshold to 100%.

At step 128, Sequential Rule Induction is applied to the reverse chronologically ordered elements to produce a set of repetitive sequential patterns in a reverse timespace.

At step 130, the order of elements in each discovered pattern is reversed to yield patterns in correct (forward) temporal flow.

At step 132, the two sets of patterns, one set from the 'forward discovery' process and one set from the 'reverse discovery' process, are merged.

At step 134, duplicate patterns are removed. The forward and reverse discovery processes have the chance of yielding some patterns that are identical—in these cases, only one example is kept for final output.

At step 136, output a final set of resultant patterns.

It should be understood that in the present exemplary embodiment, the steps associated with forward processing, i.e., steps 112 through 132, can be performed substantially in parallel with the steps associated with reverse processing, i.e., steps 118 through 132. However, forward processing may precede reverse processing, or vice versa, in other embodiments.

Reverse Time-Flow Advantages

The invention provides advantages in pattern discovery by reversing the flow of time in a dataset to be examined as an adjunct to utilizing a conventional forward flow analysis. It should be understood that the advantage lies in the statistical results (e.g., Support and Confidence) and not in the statistical calculations, which do not change irrespective of whether the dataset is analyzed in forward or reverse time flow. The preparation for this beneficial adjunct analysis is best illustrated, with reference again to FIGS. 2C-2E.

Referring again to FIGS. 2C-2E, the temporal dataset is shown to be divided into ten bins to facilitate processing in both the forward and reverse directions. The Support statistic was previously defined above as the number of times a pattern occurs in the dataset, typically represented as a percentage (a pattern such as pattern, A→B→C→D, of bin #2 of FIGS. 2D and 2E). Recall that the support statistic is calculated as:

$$\text{Support } (\%) = \frac{\text{\# of bins in which a pattern has occurred}}{\text{Total \# of bins}} \times 100$$

It should be understood that the reverse temporal dataset of FIG. 2E does not affect the support statistic for a pattern, such as pattern (A→B→C→D), This is true because the pattern elements remain the same, just in reverse order. Hence, the number of times the whole pattern occurs does not change.

In accordance with a conventional forward temporal processing approach, as described in the flowchart of FIG. 1, Support is calculated to be 10% because the full pattern, A→B→C→D, is present in only 1 of the 10 bins (i.e., bin #2). In the example illustrated in FIGS. 2C-2E, Confidence is calculated at 20% because the last element "D" is present in only 1 of the 5 bins (i.e., bin 2) in which the first 3 elements (A, B, C) of the patter are present. Equation [2] above describes an equation for calculating Confidence.

Confidence(%)=(1/5)×100=20%

Therefore, using Sequential Rule Induction (SRI) techniques to discover the pattern (e.g., A→B→C→D), SRI would set the thresholds below 10% and 20% for Support and Confidence, respectively. For a large, but 'regular' dataset, these values would generate many discovered patterns, possibly thousands or more.

FIG. 2E is a table illustrating the resultant temporal dataset of FIGS. 2A-2D utilizing a reverse temporal processing approach, in accordance with invention principles. It is shown that for a reverse temporal processing approach, the support statistic remains the same (e.g., 10%). In other words, there is still only a single bin (i.e., bin 2) containing a full pattern.

However, because this pattern, as well as all other patterns manifest themselves in reverse order, the confidence calculation changes from 20% to 100%. This is a result of only one bin having the first 3 elements (D, C, B) of the (reverse) pattern present, and that bin also having the final element (A) present.

It should therefore be understood that when the SRI algorithm processes the temporal dataset in the reverse direction (as shown at step 124 of the flowchart), the Support statistic can be set to (less than) 10% but Confidence can be set much higher than in the forward direction. It must in fact be set at 100%, and the pattern (e.g., A→B→C⇒D) is still discovered.

It is noted that, in actuality, it is the reverse pattern that is actually discovered in accordance with a reverse processing approach. Accordingly, it is necessary to invert the discovered pattern to its correct (causal) order. This is true in general of all patterns discovered during reverse processing. In fact, fixing the Confidence at 100% is a necessary condition for reverse temporal processing due to the inversion of the patterns after discovery. The reason for this is that there is no possibility of causality for reverse patterns whose last element is not always present because this translates to the first element of the pattern not being present when the pattern is inverted.

It has therefore been shown that forward processing, support can be set to a small value and confidence to a value close to 100% (or as high as desired so as not to discover a huge set of patterns), and this will discover a manageable set of significant patterns (but not pattern A, B, C, D of the example). For reverse processing, support again can be set to a small value, however, confidence must be fixed at 100%. This will also discover a manageable set of significant patterns (including pattern A, B, C, D of the example) that indeed might have been missed by forward processing.

While the invention has been described with reference to an example embodiment, it will be understood by those skilled in the art that a variety of modifications, additions and deletions are within the scope of the invention, as defined by the following claims.

What is clamed is:

1. A method for miming an input dataset to discover sequential patterns therein, the method comprising:
  receiving an input dataset including a plurality of data elements as input;
  discovering a set of repetitive sequential patterns in the input dataset, wherein the step of discovering a set of repetitive sequential patterns in the input dataset further comprises:
  a) producing a set of forward repetitive sequential patterns;
  b) producing a re-ordered set of reverse repetitive sequential patterns, wherein the step of producing a re-ordered set of reverse repetitive sequential patterns, further comprises:
  a) re-arranqinq the ordered data elements from a forward order to a reverse order,
  b) separating the reverse ordered data elements into bins;
  c) setting at least one statistical threshold for reverse processing;
  d) applying Sequential Rule Induction to the chronologically ordered data elements to produce a set of reverse repetitive sequential patterns;
  e) reversing the data element order in the set of reverse repetitive sequential patterns to produce said re-ordered set of reverse repetitive sequential patterns; and
  c) merging the set of forward repetitive sequential patterns with the set of reverse repetitive sequential patterns to discover said set of repetitive sequential patterns; and
  extracting the input data elements that comprise the repetitive sequential patterns.

2. A method according to claim 1, further comprising displaying the final set of patterns to an end user.

3. A method according to claim 1 further comprising: receiving at least one additional dataset as input.

4. A method according to claim 3, further comprising: merging the input dataset and the at least one additional dataset prior to said discovering step.

5. A method according to claim 1, wherein the step of producing a set of forward repetitive sequential patterns, further comprises:
  a) arranging the plurality of data elements of the input dataset in forward order;
  b) separating the ordered data elements into bins in the forward order;
  c) setting at least one statistical threshold for forward processing; and
  d) applying Sequential Rule Induction to the forward ordered data elements to produce said set of forward repetitive sequential patterns.

6. A method according to claim 5, wherein the step of arranging the plurality of data elements of the input dataset in forward order further comprises arranging the plurality of data elements of the input dataset in a chronological forward order based on forward time-stamp information associated with each of the plurality of data elements.

7. A method according to claim 5, wherein the step of separating the ordered data elements into bins in the forward order further comprises separating chronologically ordered data elements into time bins in the forward order based on forward time-stamp information associated with the data elements.

8. A method according to claim 5, wherein the step of applying Sequential Rule Induction to the ordered data elements to produce said set of forward repetitive sequential patterns further comprises applying Sequential Rule Induction to chronologically ordered data elements to produce said set of forward repetitive sequential patterns based on the chronological ordering of the data elements.

9. A method according to claim 5, wherein the at least one statistical threshold is a Support statistic defined as the number of times a pattern has occurred in the input dataset.

10. A method according to claim 5, wherein the at least one statistical threshold is a Confidence statistic defined as how many times a final element of a pattern occurred as a percentage of the number of times a first part of the pattern has occurred in the input dataset.

11. A method according to claim 1, wherein said step of merging the set of forward repetitive sequential patterns with the set of reverse repetitive sequential patterns comprises removing duplicate patterns from said forward and said reverse repetitive sequential patterns.

12. A method according to claim 1, wherein the step of arranging the ordered data elements into bins based on the reverse time-stamp information further comprises, arranging chronologically ordered data elements into time bins based on reverse time-stamp information associated with the data elements.

13. A method according to claim 1, wherein the step of separating the reverse ordered data elements into bins further comprises separating chronologically ordered data elements into time bins in a reverse time-space based on reverse time-stamp information associated with the data elements.

14. A method according to claim 1, wherein the step of applying Sequential Rule induction to the reverse ordered data elements to produce a set of reverse repetitive sequential patterns further comprises applying Sequential Rule Induction to chronologically ordered data elements to produce a set of reverse repetitive sequential patterns.

15. A method according to claim 1, wherein the at least one statistical threshold for reverse processing is a Support statistic defined as the number of times a pattern has occurred in the input dataset.

16. A method according to claim 1, wherein the at least one statistical threshold for reverse processing is a Confidence statistic defined as how many dimes a final element of a pattern occurred as a percentage of the number of times a first part of the pattern has occurred in the input dataset.

17. A computer program product for implementing a method for mining a dataset to discover sequential repetitive patterns therein, the computer program product comprising one or more computer-readable storage medium having thereon the following: computer-executable instructions for:
    receiving an input dataset including a plurality of data elements as input;
    discovering a set of repetitive sequential patterns in the input dataset, wherein the computer-executable instruction for discovering a set of repetitive sequential patterns in the received dataset, further comprises computer-executable instructions for:
    a) producing a set of forward repetitive sequential patterns;
    b) producing a re-ordered set of reverse repe6tive sequential patterns, wherein the computer executable instruction for producing a re-ordered set of reverse repetitive sequential patterns, further comprises computer executable instructions for:
    a) determining a maximum time-stamp value using the forward timestamp information;
    b) calculating reverse time-stamp information for each of the plurality of data elements using the forward times-tamp information and the maximum time-stamp information;
    c) arranging the chronologically ordered data elements into time bins based on the reverse time-stamp information;
    d) separating the chronologically ordered data elements into time bins in a reverse time-space based on the reverse time-stamp information;
    e) setting at least one statistical threshold for reverse processing;
    f) applying Sequential Rule Induction to the chronologically ordered dam elements to produce a set of reverse repetitive sequential patterns;
    g) reversing the data element order in the set of reverse repetitive sequential patterns to produce said re-ordered set of reverse repetitive sequential patterns; and
    c) merging the set of forward repetitive sequential patterns with the set of reverse repetitive sequential patterns to discover said set of repetitive sequential patterns; and
    extracting the data elements from the input dataset using the set of repetitive sequential patterns.

18. The computer program product according to claim 17, wherein the computer-executable instruction for producing a set of forward repetitive sequential patterns, further comprises computer-executable instructions for:
    a) arranging the plurality of data elements of the input dataset in forward chronological order based on forward time-stamp information associated with each of the plurality of data elements;
    b) separating the chronologically ordered data elements into time bins in a forward time-space based on the forward time-stamp information;
    c) setting at least one statistical threshold for forward processing; and
    d) applying Sequential Rule Induction to the chronologically ordered data elements to produce said set of forward repetitive sequential patterns.

19. A computer program product according to claim 18, wherein the at least one statistical threshold is a Support statistic for describing the number of times a pattern has occurred in the input dataset.

20. A computer program product according to claim 18, wherein the at least one statistical threshold is a Confidence statistic defining how many times a final element of a pattern occurred as a percentage of the number of times a first part of the pattern has occurred in the input dataset.

21. A computer program product according to claim 17, wherein the computer executable instruction for merging the set of forward repetitive sequential patterns with the set of reverse repetitive sequential patterns further comprises computer executable instructions for removing duplicate patterns from the merged set of patterns to produce said set of repetitive sequential patterns.

* * * * *